United States Patent
Yu

[19]

[11] Patent Number: 6,115,598
[45] Date of Patent: Sep. 5, 2000

[54] EMERGENCY CALL NUMBER IDENTIFICATION IN A WIRELESS TELEPHONE

[75] Inventor: Loc Yu, San Diego, Calif.

[73] Assignee: Uniden America Corporation, Ft. Worth, Tex.

[21] Appl. No.: 09/074,303

[22] Filed: May 6, 1998

[51] Int. Cl.[7] .............................. H04Q 7/32; H04Q 7/38
[52] U.S. Cl. .................. 455/404; 455/414; 455/521; 455/456
[58] Field of Search ...................... 455/404, 550, 455/521, 435, 414, 456; 379/37

[56] References Cited

U.S. PATENT DOCUMENTS

| 5,563,931 | 10/1996 | Bishop et al. | 455/404 |
| 5,602,901 | 2/1997 | Redden et al. | 455/404 |
| 5,689,548 | 11/1997 | Maupin et al. | 455/404 |

*Primary Examiner*—Daniel S. Hunter
*Assistant Examiner*—Alan T. Gantt
*Attorney, Agent, or Firm*—Kevin J. Zimmer; Cooley Godward LLP

[57] ABSTRACT

A method for facilitating the placement of emergency calls from a wireless telephone within a cellular, or other wireless, communication system is disclosed herein. A wireless telephone is configured to receive from a base station a local emergency number associated with the service area of the base station. During operation of the wireless telephone, each number dialed or otherwise entered in by a user is compared to the local emergency number. If the dialed number matches the local emergency number, an emergency call is initiated by the wireless telephone; otherwise, the wireless telephone initiates a standard telephone call in response to entry of the dialed number. The user interface of the wireless telephone may optionally provide an indication upon the placement of an emergency call.

11 Claims, 3 Drawing Sheets

EMERGENCY CALL NUMBER IDENTIFICATION IN A WIRELESS TELEPHONE

BACKGROUND OF THE INVENTION

I. Field of the Invention

The present invention relates to cellular telephone networks and, in particular, to a technique for facilitating the calling of emergency numbers from cellular telephones.

II. Description of the Related Art

In recent years, telephonic communication effectuated by way of a cellular, or other wireless, communication network has become increasingly popular. In such a system, signals are transmitted between two communication systems by way of radio frequency signals over radio frequency channels. Initiation of communication links in a cellular communication system is typically accomplished in a manner analogous to the initiation of telephonic communication links in a conventional wireline, telephonic system. A calling party initiates communication with a called party by entering an identification number, i.e., the telephone number, of the party to whom telephonic communication is to be effectuated. Network switching apparatus interprets the telephone number and provides the necessary connections to effectuate the telephonic communication.

In some sections of the United States, telephonic networks provide emergency "911" service. Other countries provide analogous service. In areas of the country which provide for "911" service, a caller requiring emergency assistance dials, or enters, the digits 9-1-1. When the telephonic network detects entry of such digits, connection of the calling party to a public safety answering point ("PSAP") is immediately effectuated. In other countries, other sequences of digits are entered by a caller, similarly to be connected to a PSAP or other emergency dispatch center.

Emergency or "911" calls originating from the cellular network are routed to a PSAP in a manner similar to that used for landline 911calls. However, due to the unique nature of the cellular system, other methods have also been established to aid in emergency call handling.

For example, it is known to have a 911 button, or some other pre-programmed button, on the terminal or mobile station. Unfortunately, such "pre-programmed" approaches present difficulties for those users who "roam" with their telephones (travel into service areas other than their home service area). Since some service areas use "911" as the emergency number and other areas use different numbers (e.g., "999"), a telephone pre-programmed with an emergency number corresponding to a particular service area may not be useful when the pre-programmed function is employed during emergency situations in other service areas. In addition, the provision of a dedicated emergency key entails a non-standard interface design, which may increase telephone complexity and expense.

Accordingly, a need in the art exists for a wireless telephone capable of facilitating the placement of emergency calls outside of a home service area.

SUMMARY OF THE INVENTION

The present invention advantageously provides a method for facilitating the placement of emergency calls from a wireless telephone within a cellular, or other wireless, communication system. In accordance with the invention, the wireless telephone is configured to receive from a base station a local emergency number associated with the service area of the base station. During operation of the wireless telephone, a telephone number dialed or otherwise entered in by a user is compared to the local emergency number. If the dialed number matches the local emergency number, an emergency call is initiated by the wireless telephone; otherwise, the wireless telephone initiates a standard telephone call in response to entry of the dialed number. The user interface of the wireless telephone may optionally provide an indication upon the placement of an emergency call.

The method of the present invention advantageously ensures that a user "roaming" from a home service area will be capable of utilizing services in other service areas accessed via the emergency number associated with the user's home service area. As an example, consider the case where "911" is the emergency number associated with the user's home service area, "999" is the emergency number for a neighboring service area, and "911" has been assigned to a supplementary service (e.g., a stock quotation service) within the neighboring service area. If the user were to a utilize a standard wireless telephone pre-programmed with a "911" emergency number when roaming in the neighboring service area, the user would be precluded from accessing the supplementary service since the dialing of "911" would be recognized by the standard wireless telephone as an emergency call. In contrast, the method of the present invention prescribes that the "999" emergency number for the neighboring service area be provided to the wireless telephone of the roaming user upon entry into such neighboring service area. Upon the dialing or other entry of "911" into the roaming user's wireless telephone, the dialed "911" number would be compared to the "999" number received from the base station. Based upon this comparison it would be concluded that an emergency call had not been requested, and a standard telephone call would be placed to access the supplementary service.

BRIEF DESCRIPTION OF THE DRAWINGS

For a better understanding of the features, objects, and advantages of the present invention, reference should be made to the following detailed description taken in conjunction with the following drawings, in which.

DETAILED DESCRIPTION OF THE PREFERRED EMBODIMENTS

Figure 1:
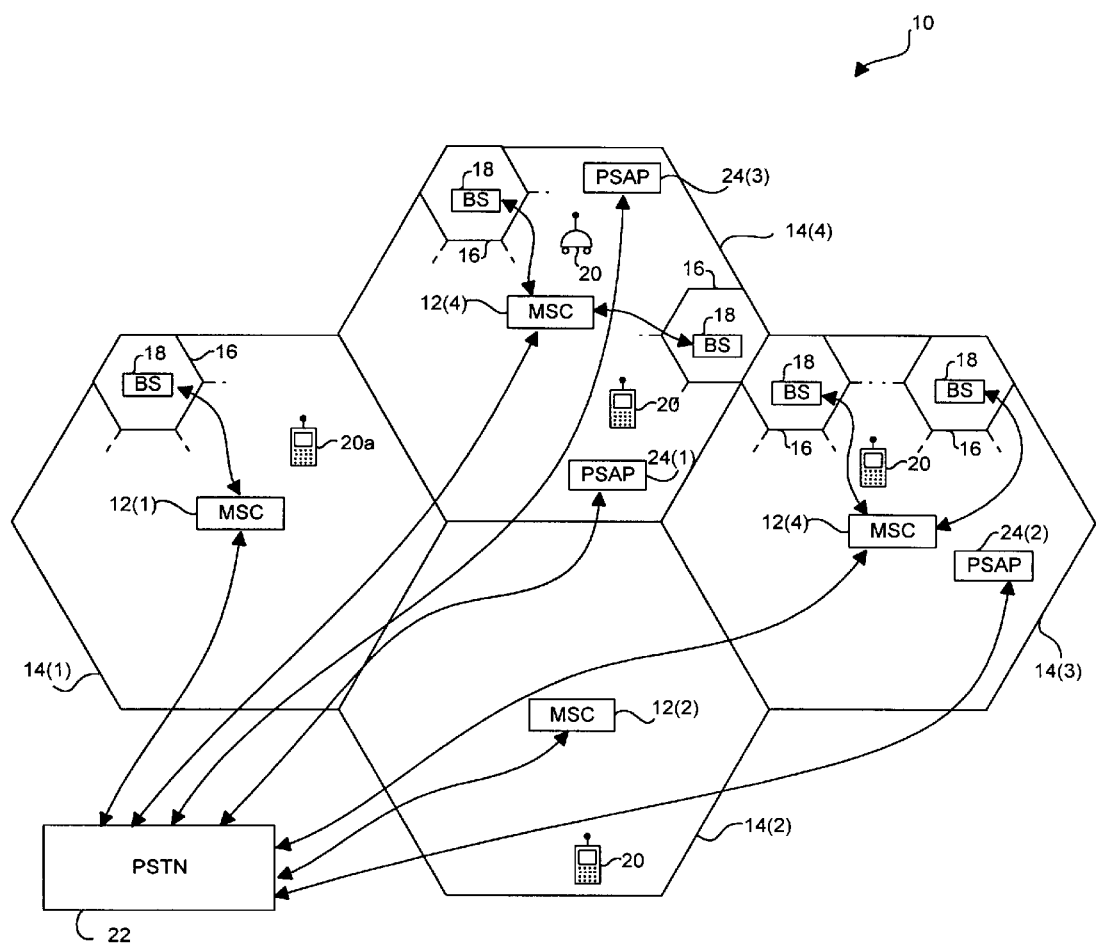
FIG. 1 shows a block diagram of a cellular communication network in which may be practiced the emergency call placement technique of the present invention.

Reference will now be made in detail to the present preferred embodiment of the invention, an example of which is illustrated in the accompanying drawings. Wherever possible, the same reference numerals will be used throughout the drawings to refer to the same or like parts.

Referring to FIG. 1, there is shown a block diagram of a cellular communication network 10 for providing cellular telephone service throughout a geographic coverage area.

The cellular network 10 comprises a plurality of mobile switching centers (MSCs) 12, each disposed to control the provision of cellular telephone service in a particular service area 14 of the coverage area. Each service area 14 comprises a plurality of cells 16 (all not shown), wherein each cell includes at least one base station (BS) 18 for effectuating radio frequency communications with mobile stations (MS) 20 located within the cell. The base stations 18 are operatively connected to the mobile switching center 12 for the service area 14 within which the cells 16 for the connected base stations are located. The mobile switching centers 12 facilitate communication between the cellular network 10 and the public switched telephone network (PSTN) 22.

The general operation of a cellular network 10 of the type depicted in FIG. 1 with regard to providing telephonic communication with mobile stations 20 is well known to those skilled in the art, and will not be described in detail herein. The cellular network 10 may comprise an analog advanced mobile phone system (AMPS), a Group Special Mobile (GSM) system, a digital D-AMPS system, a time division multiple access (TDMA) system, a code division multiple access (CDMA) system, or the like.

Connected to the public switched telephone network 22 are a plurality of public safety answering point (PSAP) systems 24. Each public safety answering point system 24 is utilized by emergency service providers (such as the police department, fire department, or rescue department) as a central point for the reception of emergency services telephone calls (e.g., dial 911calls) and the dispatching of emergency services personnel within an associated emergency services area. Certain ones of the mobile switching centers 12 (and in general their services areas 14) are located within the emergency service area handled by one PSAP system 24, while other mobile switching centers (and service areas) are located within the emergency service area handled by another PSAP system. It is also possible that the service area 14 of one mobile switching center 12 may be serviced by more than one PSAP 24.

Presently, the telephone numbers "911" and "*999" are typically used to place emergency calls in wireless systems. For purposes of example, the numbers 911 and *999 will be assumed to be used for emergency calls in service areas 14(1) and 14(2), respectively. As indicated by FIG. 1, a conventional mobile station 20a is located in service area 14(1). When a user of mobile station 20a dials 911, the mobile station 20a may be pre-programmed to recognize this as an emergency sequence. In such event the mobile station initiates an emergency call to the base station 18 serving the cell 16 of the service area 14(1) in which the mobile station is located. The receiving base station 18 sets up the call to MSC 12(1), which recognizes a special emergency code in the message from such base station 18. The MSC 12(1) then determines the manner in which the emergency call should be routed to the appropriate PSAP 24.

When the user of mobile station 20a moves into service area 14(2), the mobile station 20a may operate therein in what is known in the art as a "roaming" mode. MSC 12(2) identifies mobile station 20a when it becomes powered on within service area 14(2), at which point mobile station 20a may begin operating in most respects as if it were within its home service area 14(1). However, if the mobile station 20a has been pre-programmed to recognize the emergency number associated with its home service area 14(1) (i.e., 911), then it may prove difficult for a user of mobile station 20a to place an emergency call in service area 14(2). This is because mobile station 20a will incorrectly recognize 911 as an emergency call when this number is dialed in service area 14(2), which may lead to an emergency call indication erroneously being sent to MSC 12(2).

Even when the correct emergency call number (i.e., *999) is dialed into mobile station 20a within service area 14(2), this number will not correctly be recognized by mobile station 20a as an emergency call number if 911 has been pre-programmed as the default emergency number. Accordingly, difficulties in placing emergency calls arise when mobile stations configured to recognize a particular emergency number "roam" outside of a home service area.

In accordance with the present invention, a mobile station is implemented so as to be capable of correctly determining when the local emergency number for the service area in which it is operative has been dialed by a user. As is described below, such a mobile station receives and stores the local emergency number from a base station during the registration process occurring upon entry of the mobile station into a new service area. The mobile station then compares each dialed number with the stored local emergency number, and initiates an emergency call when a match is detected. In this way various supplementary services may be accessed by a roaming mobile station even when such services are invoked via the default emergency number of the mobile station's home service area. This is because after receiving and storing the local emergency number of the service area in which it is operative, the mobile station will not erroneously interpret the dialing of the emergency number for its home service area as a request to place an emergency call.

Figure 2:
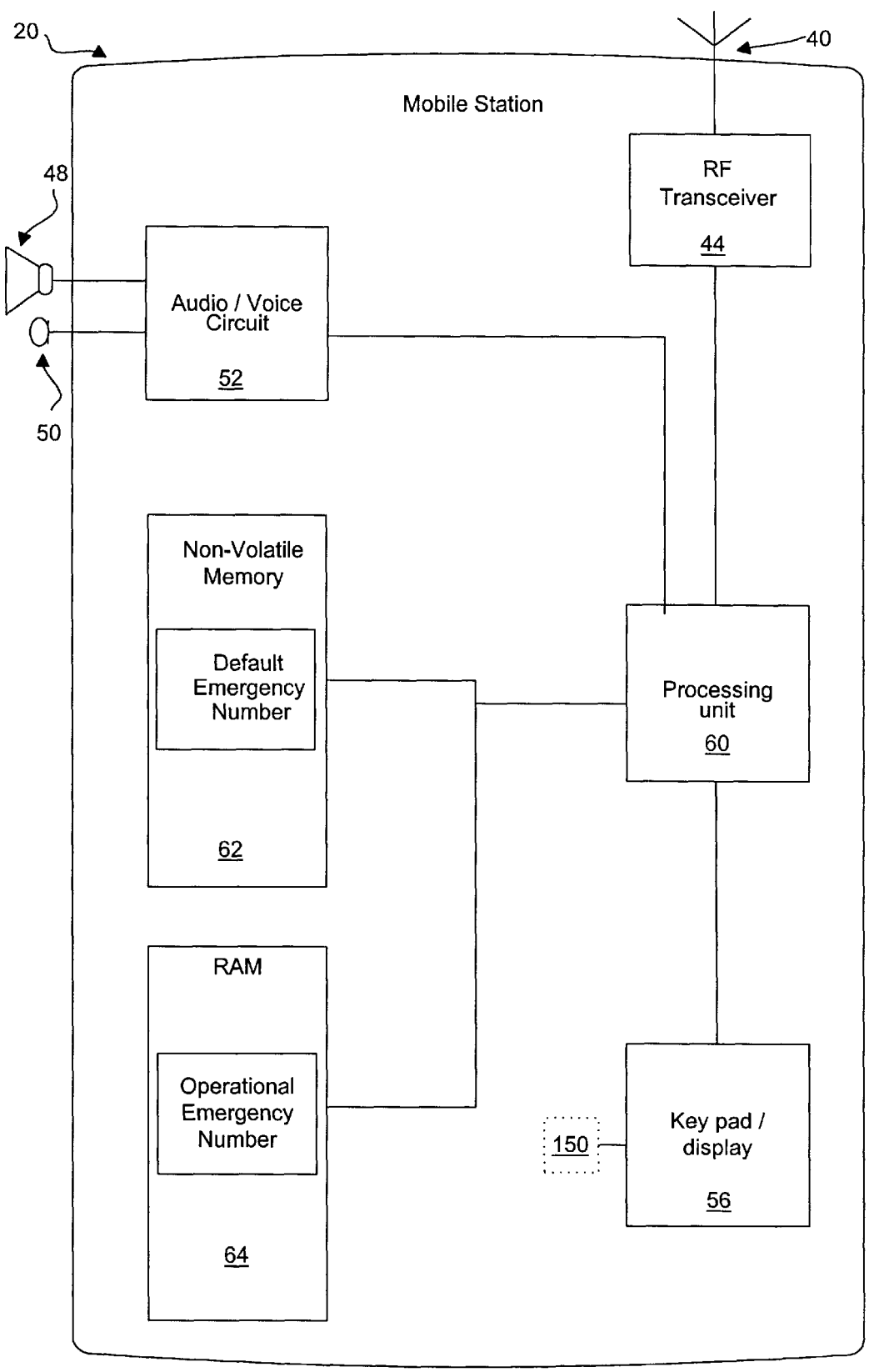
FIG. 2 is a block diagram of an exemplary implementation of a mobile station configured in accordance with the present invention.

Referring to FIG. 2, a block diagram is shown of an exemplary implementation of a mobile station 20 configured in accordance with the present invention. The mobile station 20 includes all of the components generally included within conventional cellular telephones. For example, mobile station 20 includes an antenna 40 coupled to an RF transceiver 44, which collectively function to transmit and receive radio frequency (RF) signals. A speaker 48 and microphone 50 are connected to and controlled by standard audio/voice electronics 52. A user of mobile station 20 may enter and view telephone numbers, codes an the like by way of keypad/display 56.

The operation of the mobile station 20 is generally controlled by a microprocessor and related circuitry collectively identified as processing unit 60. The processing unit 60 is operatively coupled to each of the elements described above as well as to non-volatile memory 62 and random access memory ("RAM") 64. As is discussed below with reference to FIGS. 3 and 4, the processing unit 60, non-volatile memory 62 and RAM 64 effectively function as an emergency call placement module within mobile station 20.

Figures 3, 4:
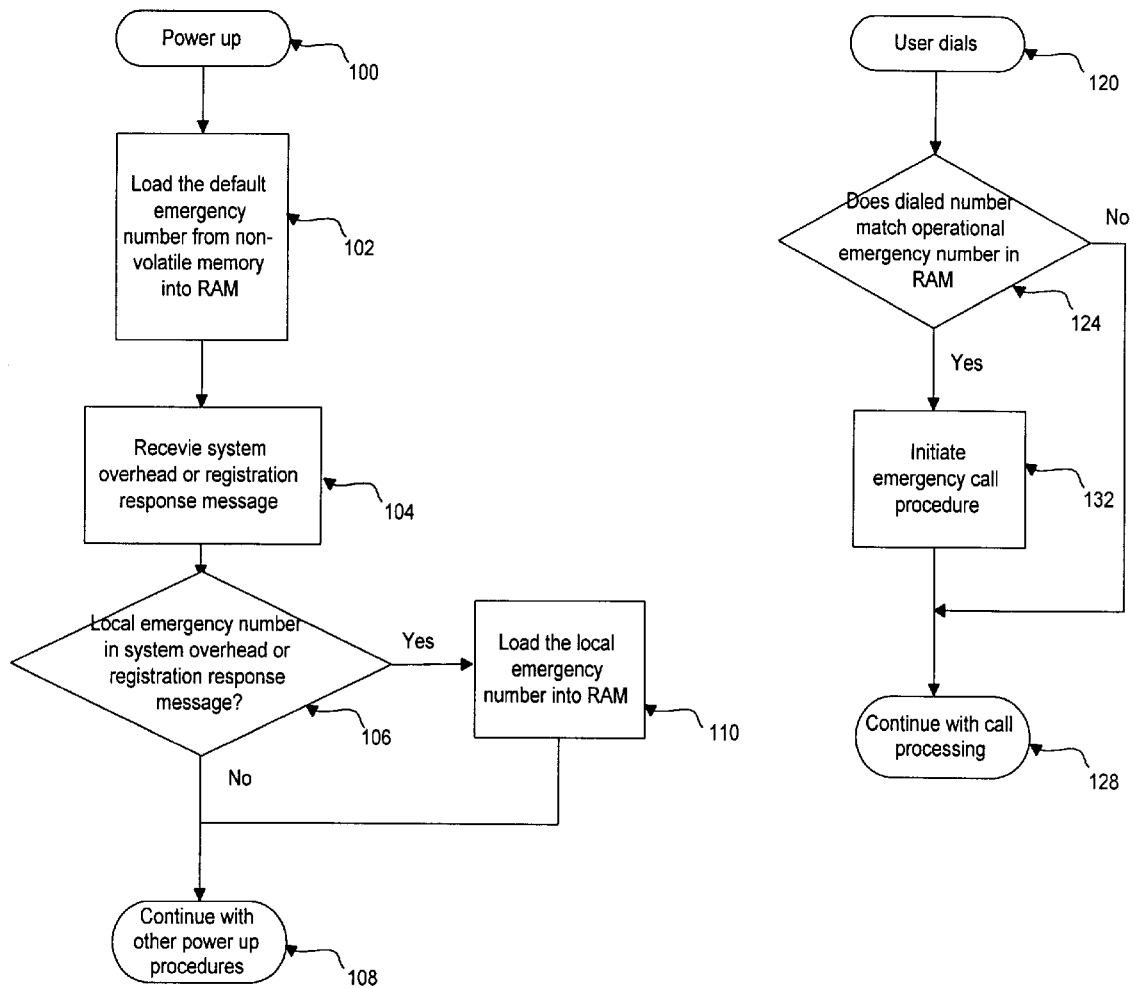
FIG. 3 is a flowchart of the processing performed by a mobile station in connection with acquisition of a local emergency number pursuant to the invention.
FIG. 4 is a flowchart showing the processing performed by a mobile station in accordance with an exemplary emergency call placement procedure of the invention.

FIG. 3 is a flowchart of the processing performed by the mobile station 20 in connection with acquisition of a local emergency number pursuant to the invention. The procedure begins at step 100, during which the power for mobile station 20 is turned on. The default emergency number stored within non-volatile memory 62 is then loaded into RAM 64 during step 102. In step 104, the mobile station receives various system overhead or registration messages which may contain the local emergency number for the service area in which mobile station 20 is operative. In a preferred implementation of the present invention, all base stations within the service area in which the mobile station 20 is located will include the local emergency number within system overhead messages, or alternately within messages exchanged during a system registration process.

In decision step 106, the processing unit 60 extracts the local emergency number from such system overhead or registration messages. If the local emergency number is not included within these messages, then the mobile station 20 continues with standard power-up procedures (step 108). If the local emergency number is so included, the extracted local emergency number is loaded into RAM 64 (step 110) and standard power-up procedures are continued (step 108).

Turning to FIG. 4, a flowchart is shown of the processing performed by the mobile station 20 in accordance with an exemplary emergency call placement procedure of the invention. The steps set forth in FIG. 4 presuppose that the procedure described above with reference to FIG. 3 has been completed. In step 120 of FIG. 4, the user dials a telephone number into mobile station 20 by way of keypad 56. The processing unit 60 then determines whether the dialed telephone number matches the emergency number currently stored in RAM 64 (step 124). If a match is not detected, the processing unit 60 proceeds with standard call processing (step 128).

If the processing unit 60 does detect a match between the dialed number and the telephone number stored in RAM 64, an emergency call placement procedure is initiated (step 132). Initiation of such a procedure may involve, for example, the processing unit 60 setting to a predefined state an "emergency call" bit or the equivalent within a call origination message. Those skilled in the art will appreciate that the particular manner in which an emergency call is initiated may be dependent upon the specific wireless communication protocol being utilized (e.g., GSM, IS-136, D-AMPS, IS-95). Accordingly, emergency calls will be initiated while roaming only upon dialing of the emergency call number corresponding to the service are in which the mobile station is located. This advantageously allows a user to access supplementary services to which have been assigned the emergency number of the user's home service area.

In an alternate implementation, it may be desired to include a dedicated emergency call key 150 (shown in phantom in FIG. 2) within the display 56. Selection of emergency call key 150 by the user would cause initiation of an emergency call procedure using the telephone number currently stored in RAM 64. Processing would then proceed in accordance with step 132 of FIG. 4. The display 56 may optionally include a light emitting diode (LED) or the like for indicating to the user when an emergency call has been placed.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, and clearly many modifications and variations are possible in view of the above teachings. It is intended that the scope of the invention be defined by the following Claims and their equivalents.

We claim:

1. In a wireless communication system in which a wireless telephone is disposed for communication with at least one base station within a service area, a method for placing emergency calls comprising the steps of:

receiving from said base station at said wireless telephone an emergency number associated with said service area upon said wireless telephone becoming present within said service area;

dialing into said wireless telephone a dialed number;

comparing said dialed number to said emergency number; and initiating at said wireless telephone an emergency call when said dialed number matches said emergency number.

2. The method of claim 1 further including the steps of extracting said emergency number from an overhead message received at said wireless telephone, and storing said emergency number within said wireless telephone.

3. The method of claim 1 further including the step of initiating a standard telephone call based upon said dialed number when said dialed number does not match said emergency number.

4. The method of claim 1 wherein said step of initiating an emergency call includes the step of setting an emergency call bit to a predetermined state within a call origination message transmitted from said wireless telephone to said base station.

5. An emergency call placement apparatus for a wireless telephone operative within a service area having a base station, said wireless telephone including a keypad for dialing said wireless telephone, said emergency call placement apparatus comprising:

memory means for storing an emergency number received by said wireless telephone from said base station upon said wireless telephone becoming present within said service area, said emergency number being associated with said service area;

means for comparing a dialed number entered into said wireless telephone through said keypad to said emergency number; and means for initiating an emergency call when said dialed number matches said emergency number.

6. The emergency call placement apparatus of claim 5 further including means for extracting said emergency number from an overhead message received at said wireless telephone.

7. The emergency call placement apparatus of claim 5 further including means for initiating a standard telephone call based upon said dialed number when said dialed number does not match said emergency number.

8. The emergency call placement apparatus of claim 5 further including means for storing a default emergency number within said memory means in response to the occurrence of a predefined event within said wireless telephone, said emergency number being stored in said memory means in lieu of said default emergency number when received by said wireless telephone.

9. The method of claim 1 further including the steps of receiving a second emergency number associated with a second service area in response to the presence of said wireless telephone in said second service area and storing said second emergency number within said wireless telephone.

10. The method of claim 9 further including the steps of:

dialing, subsequent to receipt of said second emergency number at said wireless telephone, into said wireless telephone a second dialed number;

comparing said second dialed number to said second emergency number; and initiating at said wireless telephone an emergency call when said second dialed number matches said second emergency number.

11. In a wireless communication system in which a wireless telephone is disposed for communication with at least one base station within a service area, a method for placing emergency calls comprising the steps of:

receiving from said base station at said wireless telephone an emergency number associated with said service area upon said wireless telephone becoming present within said service area;

dialing into said wireless telephone a dialed number;

comparing said dialed number to said emergency number; and initiating at said wireless telephone a call to said dialed number for emergency services when said dialed number matches said emergency number.

* * * * *

UNITED STATES PATENT AND TRADEMARK OFFICE
CERTIFICATE OF CORRECTION

PATENT NO. : 6,115,598
DATED : September 5, 2000
INVENTOR(S) : Loc Yu

It is certified that error appears in the above-identified patent and that said Letters Patent is hereby corrected as shown below:

Column 4,
Line 39, replace "an" with -- and --.

Column 5,
Line 31, replace "are" with -- area --.

Column 7,
Lines 7-8 of Claim 11, please delete:
"upon said wireless telephone becoming present within said service area:"

Signed and Sealed this

Twenty-third Day of October, 2001

Attest:

NICHOLAS P. GODICI
Attesting Officer
Acting Director of the United States Patent and Trademark Office